United States Patent
Upadhyay et al.

(10) Patent No.: US 10,936,288 B2
(45) Date of Patent: Mar. 2, 2021

(54) VOICE-ENABLED USER INTERFACE FRAMEWORK

(71) Applicant: SAP SE, Walldorf (DE)

(72) Inventors: Prakash Upadhyay, Mumbai (IN); Sandeep Mekala, Telangana (IN); Ashok Reddy Kalam, Andhra Pradesh (IN); Ninad Om Prakash Sapate, Bangalore (IN); Merlyn Neha Kiron, Secunderabad (IN); Raja Sagaya Sureka Salatu Mariyan, Chennai (IN); Ashwin Vijayendra, Bangalore (IN)

(73) Assignee: SAP SE, Walldorf (DE)

( * ) Notice: Subject to any disclaimer, the term of this patent is extended or adjusted under 35 U.S.C. 154(b) by 935 days.

(21) Appl. No.: 15/606,535

(22) Filed: May 26, 2017

(65) Prior Publication Data
US 2018/0341466 A1 Nov. 29, 2018

(51) Int. Cl.
*G06F 8/38* (2018.01)
*G06Q 10/06* (2012.01)
*G10L 15/22* (2006.01)
*G06F 3/0481* (2013.01)
*G06F 3/16* (2006.01)
*G06F 9/445* (2018.01)

(52) U.S. Cl.
CPC ............ *G06F 8/38* (2013.01); *G06F 3/0481* (2013.01); *G06F 3/167* (2013.01); *G06F 9/44526* (2013.01); *G06Q 10/06* (2013.01); *G10L 15/22* (2013.01); *G10L 2015/223* (2013.01)

(58) Field of Classification Search
CPC .... G06F 3/0481; G06F 3/167; G06F 9/44526; G06F 8/38; G06Q 10/06; G10L 15/22; G10L 2015/223
See application file for complete search history.

(56) References Cited

U.S. PATENT DOCUMENTS

| | | | | |
|---|---|---|---|---|
| 7,685,252 | B1* | 3/2010 | Maes | H04M 1/72561 709/217 |
| 2002/0198719 | A1* | 12/2002 | Gergic | G06F 9/451 704/270.1 |
| 2003/0046316 | A1* | 3/2003 | Gergic | G06F 9/451 715/234 |
| 2003/0137540 | A1* | 7/2003 | Klevenz | G06F 9/451 715/762 |
| 2003/0225825 | A1* | 12/2003 | Healey | G06F 8/00 709/203 |
| 2011/0051911 | A1* | 3/2011 | Agarwal | H04L 12/66 379/93.01 |

* cited by examiner

*Primary Examiner* — Eric J. Bycer
(74) *Attorney, Agent, or Firm* — Fish & Richardson P.C.

(57) ABSTRACT

A system includes a memory and a semiconductor-based processor coupled to form logic circuits. The logic circuits generate a voice-enabled user interface (UI) framework for a computer application. The voice-enabled UI framework includes a base controller coupled to a model of the computer application and one or more views that form respective voice-enabled UIs of the computer application. Each view includes a respective speech listener configured to receive speech input. The base controller includes a speech engine, a natural language processor, and a command executor. The voice-enabled UI framework further includes one or more view-specific controller extensions extending the base controller to control the one or more respective views that form the respective voice-enabled UIs of the computer application.

16 Claims, 6 Drawing Sheets

| UI Control ID | Description | Actions | Probability |
|---|---|---|---|
| a#login-btn | Link, Anchor, Login, Button | click, | "0.5" |
| Input#firstName | First, Name, Text, Box, Input | type | 0 |
| Div#salesTable | Sales, Table, Records, List | Select, Search, Display | 0 |
| ... | ... | ... | ... |

UI control dictionary 283

283a → (row 1)
283b → (row 2)
283c → (row 3)

FIG. 2C

VOICE-ENABLED USER INTERFACE FRAMEWORK

BACKGROUND

A computer application (e.g., a web application) that is hosted on a server (e.g., on a cloud computing platform) may have a front end user interface (UI) on a client device (e.g., a computer, tablet, smartphone or other electronic device) through which a user can interact with the application and view results. An example UI may include one or more interactive UI elements, widgets or controls ("UI control elements"). The UI control elements may include elements such as screen menus and icons, text entry fields, keyboard shortcuts, mouse and gesture movements, command language and online help, as well as physical buttons, dials and levers. A user may use, for example, a physical input device or component (e.g., a mouse, a keyboard, a touchscreen, remote and game controllers, etc.) of the client device to activate the UI control elements for interacting with the computer application.

For commonality, application developers can build application UIs using, for example, a set of standards for browser-based technologies (JAVASCRIPT HTML, Cascading Style Sheets (CSS), etc. The set of standards (collectively known as HTML5) may be combined in a toolkit for building web applications under a higher-level application framework (e.g., UI5) on a computing platform.

Consideration is now being extending an application framework for UIs of computer applications to include voice enabled interactions with the computer applications.

SUMMARY

In a general aspect, a system includes a memory and a semiconductor-based processor forming one or more logic circuits generating a voice-enabled user interface (UI) framework for a computer application. The voice-enabled UI framework can be a web page plugin for the computer application. The voice-enabled UI framework includes a base controller coupled to a model of the computer application. The base controller includes a speech engine, a natural language processor, and a command executor. The voice-enabled UI framework further includes one or more views that form respective voice-enabled UIs of the computer application, and includes one or more view-specific controller extensions extending the base controller to control the one or more respective views that form respective voice-enabled UIs of the computer application. Each respective view includes a respective speech listener configured to receive speech input.

In an aspect, different views present in the voice-enabled UI framework have different respective view-specific controller extensions. Each view-specific controller extension includes a navigator module customized with logic for executing actions on UI control elements of the respective view.

In an aspect, the system includes an action array listing UI control element events and actions that are supported by the framework, and an UI control dictionary that identifies UI control elements that are present in the respective views. The UI control dictionary may be a 2-dimensional array data structure including, for each UI control element, a unique identifying key of the UI control element, description of the UI control element, a listing of actions that the UI control element supports, and a probability that the UI control element is a target UI control element of a user's query.

In an aspect, the speech engine in the system is configured to process the speech input received by the respective speech listener in the respective view into a text query that is processed by the natural language processor to identify a user command and to extract a target UI control element ID and action of the user command for the respective view.

In an aspect, the command executor in the system is configured to call the view-specific controller extension for the respective view to execute the user command, and wherein the view-specific controller extension is configured to map the user command to the target UI control element and execute the action on the target UI control element in the respective view.

In an aspect, the voice-enabled UI framework of the system includes a synchronous activity execution framework in which the one or more view-specific controller extensions are configured to execute multiple commands in a user's query on the UI and to support continuous interaction between the user and UI control elements using voice commands.

In an aspect, the voice-enabled UI framework of the system includes a data structure to hold four types of information of the UI controls (e.g., UI Control Unique ID, Descriptive Words, Possible Events and Control Weight). Further, the voice-enabled UI framework of the system provides a keyboard-less and mouse-less interface for the computer application.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIG. 2C shows an example UI Control Dictionary 283, in accordance with the principals of the present disclosure.

DETAILED DESCRIPTION

A user interface (UI) framework with voice enabled interactive UI control elements is described herein, in accordance with the principles of the present disclosure.

The UI framework (hereinafter "voice-enabled UI framework") may be used for computer applications that have, for example, a Model-Controller-View (MVC) architecture for implementing user interfaces on computers. The voice-enabled UI framework may be consistent with the principles a User Experience (UX) framework of the computer applications. The voice-enabled UI framework may be implemented as one or more methods (e.g., JAVASCRIPT methods).

In an example implementation, the voice-enabled UI framework can be used to add voice-recognition based navigation capability to any computer application (e.g., a UI5 application). A "speech" plugin may be provided for a web page of a computer application (e.g., a UI5 application) under the voice-enabled UI framework. The plugin may enable views of the computer application with interactive, voice-triggered UI navigation. The voice-enabled UI framework may in some instances support native language speech recognition. Adding voice-recognition based navigation capability to the computer application may allow hands-free use of the application.

Figure 1:
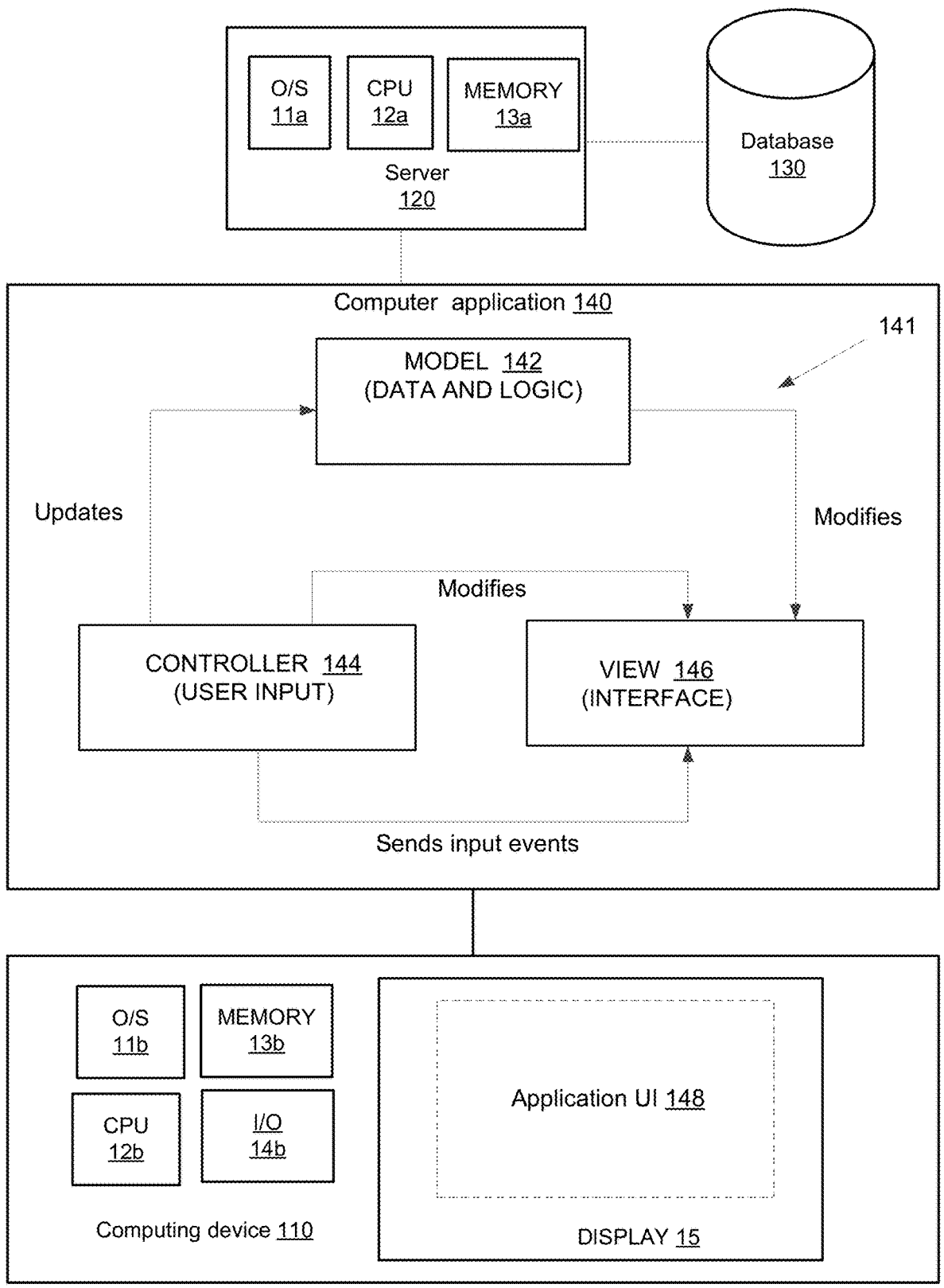
FIG. 1 is a schematic block diagram illustration of an example system an example system 100 including a computer application having a MVC architectural pattern that a user can interact with using a client computer, in accordance with the principles of the present disclosure.

FIG. 1 is a schematic block diagram showing an example system 100 including a computer application (e.g., computer application 140) that a user can interact with via a client computer (e.g., client computing device 110), in accordance with the principles of the present disclosure. Computer application 140) may have a MVC architectural structure or pattern 141

System 100 may include a backend computer system (e.g., server 120), which is connected, for example, to client computing device 110 and one or more databases (e.g., database 130). Client computing device 110 may, for example, include an O/S 11b, a CPU 12b, a memory 13b, and an I/O 14b, and a user interface (UI) or display 15. Server 120 like client computing device 110 may include computer components such as an O/S 11a, a CPU 12a, and a memory 13a, etc. Although server 120 is illustrated in the example of FIG. 1 as a single computing device, it may be understood that server 120 may represent two or more computing devices in communication with one another. Therefore, it will also be appreciated that any two or more components of system 100 may similarly be executed using some or all of the two or more computing devices in communication with one another. Conversely, it also may be appreciated that various components illustrated as being external to server 120 may actually be implemented therewith.

In system 100, computer application 140 may be hosted on one or more computers (including, for example, server 120, client computing device 110 or other virtual or physical machines). Computer application 140 may, for example, have a MVC architectural pattern with three components (or abstraction layers) i.e. a model component (e.g., model 142), a controller component (e.g., controller 144) and a view component (e.g., view 146). View 146 may be presented as an application UI 148 on client computing device 110 (e.g., on display 15) for a user to interact with, or to access, computer application 140. The UI control elements of application UI 148 may include control elements such as screen menus and icons, text entry fields, keyboard shortcuts, mouse and gesture movements, command language and online help, as well as physical buttons, dials and levers. For clarity, these UI elements, which may be traditional, are not shown in FIG. 1.

In MVC architectural pattern 141 of computer application 140, model 142 may define the application's behavior in terms of a problem domain (e.g., a business domain), independent of the user interface. Model 142 may be configured to directly manage the data, logic and rules of the application. View 146 may be any output representation of information (e.g., a web page, a chart, or a diagram, etc.) by the application. In example implementations, view 146 (which may be built with HTML, CSS, JAVASCRIPT, and often templates) may be presented as an application UI (e.g., application UI 148) that a user can interact with to access application 140. Controller 144 may be configured to accept input (e.g., user actions) and convert the input to commands for model 142 or view 146.

Consistent with traditionally defined interactions of components in a MVC architectural pattern, model 142 may store data that is retrieved (e.g., from database 130) according to commands from controller 144 and displayed in view 146; view 146 may generate new output for display to the user (e.g., on application UI 148) based on changes in model 142; and controller 144 may send commands to model 142 to update the model's state (e.g., editing a document). Controller 144 may also send commands to view 146 to change the view's presentation of the model (e.g., scrolling through a document).

In an example implementation, the logic of model 142, controller 144 and view 146 in computer application 140 may be hosted and executed entirely on the server side (e.g., on server 120). In this implementation, the user may send, for example, either hyperlink requests or form input (e.g., via application UI 148 on client computing device 110) to controller 144 and then receive, for example, a complete and updated web page (or other document) from view 146. In other implementations, the MVC pattern components of computer application 140 may execute partly on the client side (e.g., on client computing device 110).

Figure 2A:
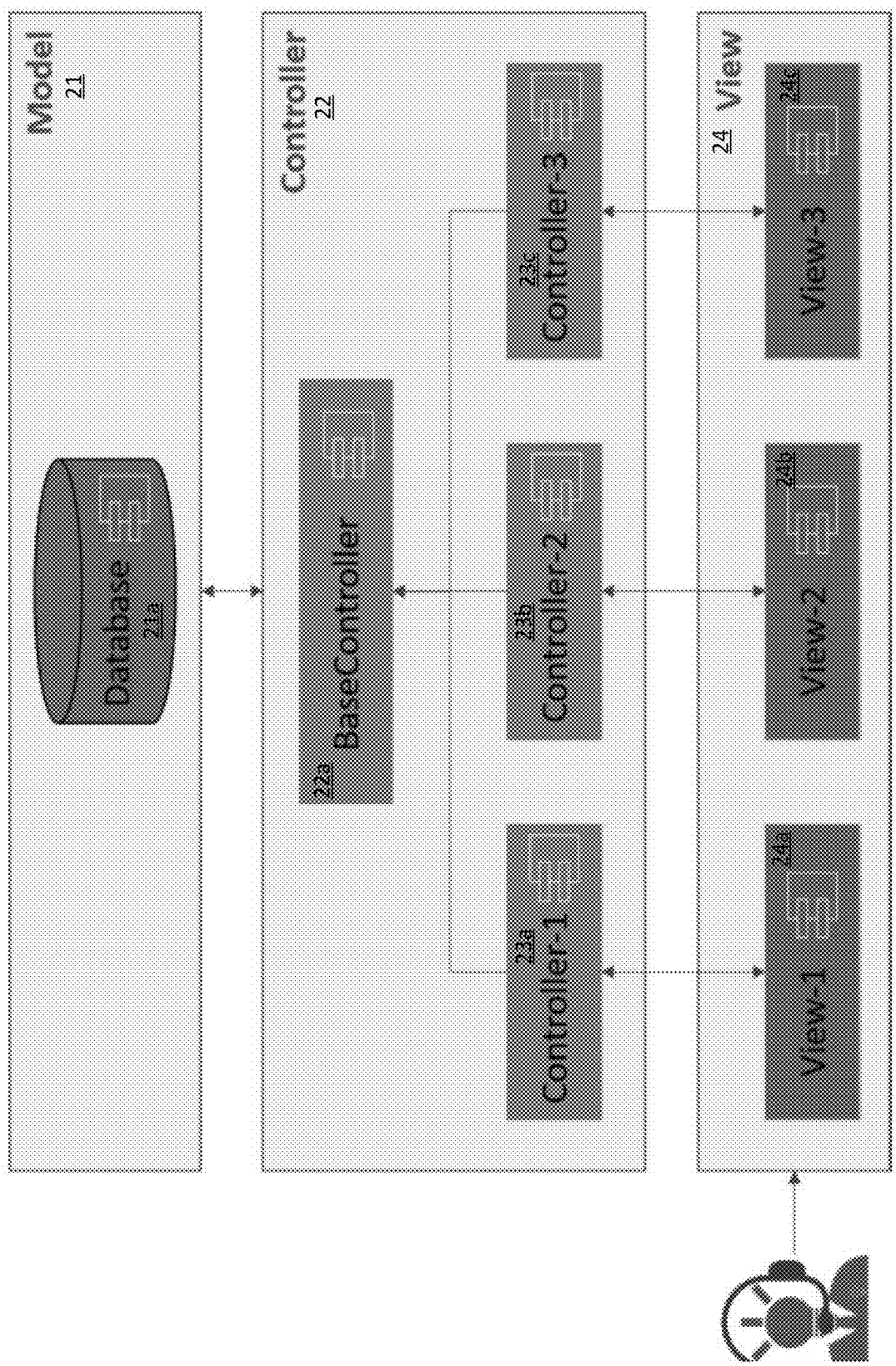
FIG. 2A is a schematic block diagram illustration of a voice-enabled UI framework that may be customized for multiple voice-enabled views of a computer application, in accordance with the principles of the present disclosure.

FIG. 2A is a schematic block diagram illustrating of a voice-enabled UI framework 200 that may be used to customize multiple voice-enabled views of the computer application, in accordance with the principles of the present disclosure. The different multiple voice-enabled views (e.g., view 24a, view 24b, view 24c, etc.) may correspond to different UIs that the computer application may support on different devices (e.g., desktop computers, laptops, mobile devices, smart phones, etc.).

Voice-enabled UI framework 200 may include a model component (e.g., model 21), a controller component (e.g., controller 22) and a view component (e.g., view 23). View 23 may include the different multiple voice enabled views (e.g., view 24a, view 24b, view 24c, etc.) corresponding to different UIs of the computer application. Controller 22 may include a central or core controller (e.g., basecontroller 22a) which provides common controller functions for all the different views. Controller 22 may further include one or more view-specific controllers (e.g., controller 23a, controller 23b, or controller 23c) corresponding to respective views (e.g., view 24a, view 24b, or view 24c), in accordance with the principles of the present disclosure. The view-specific controllers (e.g., controller 23a, controller 23b, or controller 23c) may individually extend basecontroller 22a to provide controller functions that are specific to their respective corresponding views (e.g., view 24a, view 24b, or view 24c).

Voice-enabled UI framework 200 may be used as a plugin for any existing UI5 application and is configurable for application specific requirements. Applications using voice-enabled UI framework 200 can customize the way the framework handles event implementations. Applications may use core features of the framework to create and test the voice enabled UI views.

Figure 2B:
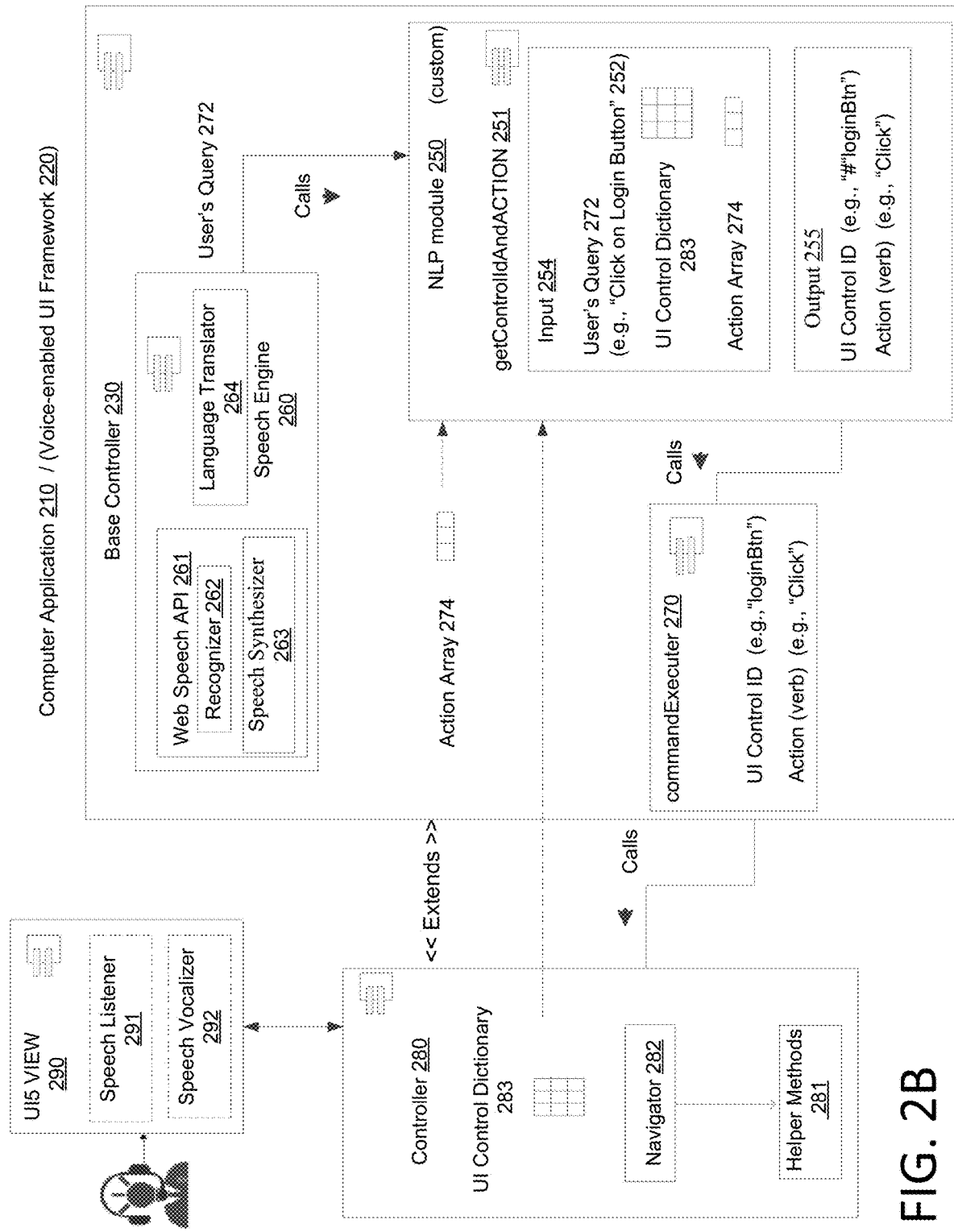
FIG. 2B is a schematic block diagram illustration of an example computer application having an architectural pattern (e.g., a MVC architectural pattern) that is extended to include a voice-enabled UI framework, in accordance with the principles of the present disclosure.

FIG. 2B is a schematic block diagram showing an example computer application (e.g., computer application 210) having an architectural pattern (e.g., a MVC architectural pattern) that is extended to include a voice-enabled UI framework 220, in accordance with the principles of the present disclosure. Computer application 210 (like computer application 140) may be launched on any computing platform (e.g., system 100, FIG. 1).

In the following, for convenience in description, the terms "computer application 210" and "voice-enabled UI framework 220" may be used interchangeably. Further, the term "view," which is a presentation of information on a UI, may be may be used interchangeably term "UI." It will be understood that a view of a computer application may be presented as a web page on a display screen of a computing device display.

Computer application 210 may, for example, present a voice-enabled UI (e.g., UI5 view 290) on client computing device 110 through which a user can interact with computer application 210 using, for example, voice commands. In an example implementation, UI5 view 290 may include a speech listener 291, which may be configured to receive user speech via audio input components (e.g., a microphone) of client computing device 110. Speech listener 291, which may be a page-level speech listener, may be configured to listen to the user's speech input and covert the speech input into text. UI5 view 290 may also include a speech vocalizer 292, which may be configured to receive speak or vocalize text via audio output components (e.g., a speaker) of client computing device 110.

Voice-enabled UI framework 220 of computer application 210, in addition to one or more views (e.g., UI5 view 290) may include a base controller 230. Base controller 230 may include a speech engine 260, a natural language processor (NLP) 250 and a command executor 270. Base controller 230 may centrally manage the voice interactions between the users and multiple views (e.g., UI5 view 290). Voice-enabled UI framework 220 may maintain a list of all the UI control elements present in a view and based on user voice input activate one or more of the UI control elements under supervision of base controller 230.

Further, voice-enabled UI framework 220 may include one or more view-specific controller extensions (e.g., controller extension 280) coupled to base controller 230.

Each controller extension (e.g., controller extension 280) may be adapted or tailored to control a respective view (e.g., UI5 view 290). Different views presented in voice-enabled UI framework 220 may have different respective controller extensions.

In an example implementation of voice-enabled UI framework 220, the user's speech input may be treated as a voice command directed to a UI element of the view. Alternatively, the user's speech input may be treated merely as plain text information.

Each controller extension (e.g., controller extension 280) may include an UI control dictionary (e.g., UI Control Dictionary 283) which identifies and describes the UI control elements that may be present in the view (UI) on the computing device.

In voice-enabled UI framework 220, an example voice command structure may have two parts—an "action verb" and an "object description". Example action verbs may, for example, include verbs such as 'Click', 'Type', 'Read', 'Filter', etc. that describe an action on a UI element. Object descriptions may identify the UI control elements of the view that are the objects of the voice command. Example voice commands including the object description may, for example, be "Click on Login Button," "Display graph xxx," "Open file yyy," 'Type name xyxy' etc.

When the user's speech input is treated as plain text information, the plain text information may be used, for example, in some instances to fill in text entry input fields on the UI. In other instances, plain text information may be secondary information related to a command (e.g., when the system prompts "Enter value for Blood Pressure" and the user vocally replies "one fifty").

A user's speech input may be complex. In example implementations voice-enabled UI framework 220, UI interactions based on the complex speech input may be broken into a series of multi-step synchronous activities or actions. For example, a speech input: "Edit Personal Information and type value for 'FirstName' as 'Atul'," may, for example, be split into a series of three activities or actions: 'Edit Personal Information,' then 'Type Name,' and then enter text value 'Atul.'

In voice-enabled UI framework 220, speech engine 260 may be configured to perform voice-to-text and text-to-voice conversion. Speech engine 260 (which is coupled to speech listener 291) may include one or more web speech APIs (e.g., web speech API 261). Web speech API 261 may include a process (e.g., recognizer 262) for recognizing user speech that a user may input using, for example, a microphone coupled to UI5 view 290. Web speech API 261 may conversely include a process (e.g., speech synthesizer 263) that may read out or vocalize text using, for example, an audio speaker coupled to UI5 view 290.

In an example implementation, speech engine 260 may include processes (e.g., language translator 264) for translating speech from one language to another language (e.g., a user's native language). Language translator 264 may, for example, translate a user's speech input in his or her native language into English language text that can be passed as a user query (e.g., User's Query 272) to a natural language processing (NLP) module (e.g., NLP Module 250).

In example implementations, speech engine 260 may include commercially available processes for speech recognition or translation (e.g., Google's™ Web Speech Engine, Google™ Translator JAVASCRIPT APIs, Apple's™ Siri™, etc.). For convenience in description, the output of speech engine 260 obtained by processing the user's speech input may referred to hereinafter as the user's speech query (e.g., User's Query 272).

Further, voice-enabled UI framework 220 may include a UI control dictionary (e.g., UI Control Dictionary 283). The UI control dictionary may, for example, be a 2-dimensional array data structure holding details about the UI control elements of UI5 view 290. For each UI control element of UI5 view 290, the 2-dimensional array data structure may include information such as a unique identifying key of the UI control element, descriptive words to help identify the UI control element accurately based on the user's speech query, actions which UI control element supports, and a "control weight" or "probability index" that the UI control element is the target UI control element of the user's speech query.

FIG. 2C shows an example UI Control Dictionary 283, in accordance with the principles of the present disclosure.

For each UI control element, UI Control Dictionary 283 may contain a 1-dimensional "control array" (e.g., control arrays 283a, 283b, 283c, etc.) containing the foregoing information. For example, for a UI control element that is a login button in form, control array 283a may be ["a#login-btn", "Link, Anchor, Login, Button", "click", "0.5"], where "a#login-btn" is the unique identifying key of the UI control element, "Link, Anchor, Login, Button" is the description of the UI control element, "click" is a listing of actions that the UI control element supports, and "0.5" is the probability that the UI control element is a target UI control element of a user's query (as determined by NPL 250).

Further, voice-enabled UI framework 220 may include a list (e.g., action array 274) of all UI control element events and actions that are supported by the framework. Action array 274 may, for example, be a 1-dimensional array (e.g., ["Click", "Type", "Read", "Transform", "Display", "Search", "Select", etc.]) listing the events and actions.

With renewed reference to FIG. 2B, in voice-enabled UI framework 220, commands in the user's speech query (i.e., the output of speech engine 260) may be acted on by command executor 270 in base controller 230. Command executor 270 may forward the user's speech query (e.g., user's query 272) to a natural language processing (NLP) module (e.g., NLP module 250) to identify a command (e.g., command "click on login button" 252) in the text of the user's speech query.

In example implementations, NLP module 250 may take as input (e.g., input 254) UI Control Dictionary 283 (e.g., control arrays 283a, 283b, 283c, etc.), action array 274 and user's query 272 text. NLP module 250 may process the input to extract target UI control element information and the action to be performed on the target UI control element. The logic in NLP module 250 may identify the target UI control element based on the query and extract the unique UI Key of the target UI control element. NLP module 250 may also analyze the query to extract the action/event to be performed on the target UI control element.

In the example shown in FIG. 2B, NLP module 250 may include algorithms (e.g., getControlIdAndAction 251) for parsing text and comparing the parsed text with the contents of action array 274 and UI control dictionary 283 to identify a target UI control element of a command in the user's query, and to identify the action verb of the command. Further, the logic in NLP module 250 may determine the probability that the identified target UI control element is the proper target UI control element and update the probability values in UI Control Dictionary 283 (e.g., control array 283a, FIG. 2C).

NLP module 250 may return values (e.g., output 255) to command executor 270. The returned values (e.g., output 255) may include the target UI control element's unique identifying key and the action verb to be performed on the target UI control element in UI5 view 290. Command executor 270 may forward these return values to a routing logic (e.g., navigator 282) in controller extension 280 for modifying UI5 view 290 according to the user's query.

In example implementations of voice-enabled UI framework 220, navigator 282 includes command routing logic and serves as the gateway for every UI interaction between controller extension 280 and UI5 view 290. Navigator 282 can be used to define actions/logic for any UI command. Navigator 282 may take as input the target UI control element's unique identifying key and the action verb to be performed on the target UI control element in UI5 view 290. The command routing logic in navigator 282 may include logic to support framework features such as synchronous voice interaction and multi-step UI interaction.

In example implementations, voice-enabled UI framework 220, each controller extension 280 may include helper methods (e.g., helper methods 281). These helper methods may be customized to support execution of any generic action verb that is supported by voice-enabled UI framework 220. Each controller extension 280 may be configured to implement these customized helper methods, which in turn may call the framework method to execute their logic.

In example implementations, helper methods 281 may include a "database" method that can handle database transactions. Navigator 282 may call the database method, for example, when the action to be performed on the target UI control element in UI5 view 290 involves a database transaction.

In example implementations, voice-enabled UI framework 220 may include a synchronous activity execution framework, which enables navigator 282 to conduct multi-step UI interactions (e.g., execute multiple commands in a user's query on the UI). The synchronous activity execution framework may support continuous interaction between a user and the UI control elements using voice commands. The synchronous activity execution framework may, for example, use JavaScript's "Promise" object to handle the synchronous event handlers. The synchronous activity execution framework may make the voice interactions natural and smart. As an example multi-step UI interaction, a user may speak: "type first name" as a command, the system may then ask: "speak the value", to which the user may reply "Smith" as text to be typed in by the system for first name.

Figure 3:
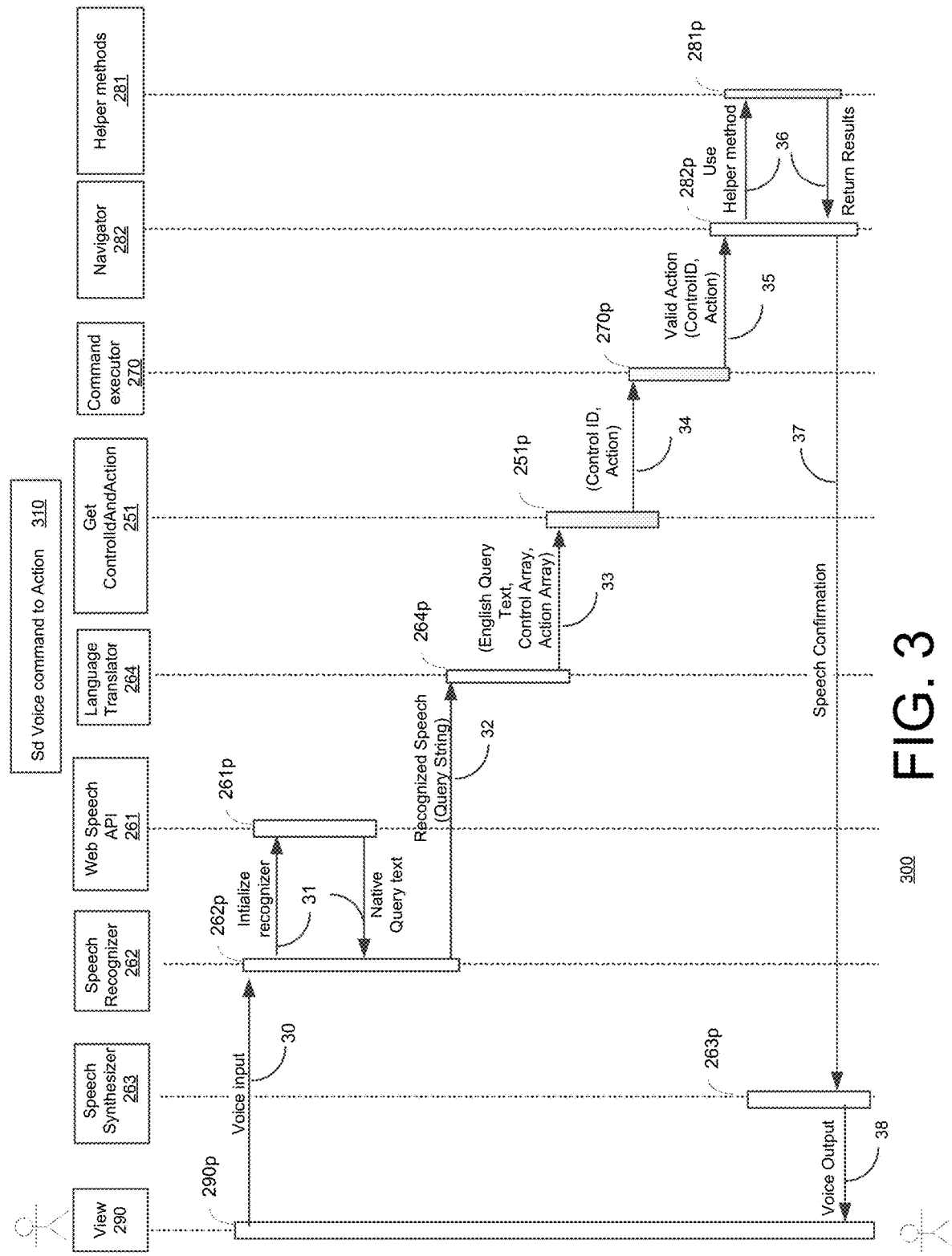
FIG. 3 is a sequence diagram illustrating how objects of voice-enabled UI framework (of FIG. 2B) interact with each other and the order in which those interactions occur when processing a speech command for a UI action, in accordance with the principles of the present disclosure.

FIG. 3 is a sequence diagram which shows how objects of voice-enabled UI framework 220 may interact with each other, and the order in which these interactions occur when processing a speech command (e.g., speech command 310) for a UI action, in accordance with the principles of the present disclosure.

In the sequence diagram, the processes of the objects of voice-enabled UI framework 220 are represented vertically and interactions (e.g., interactions 30-38) are show as arrows. In voice-enabled UI framework 220, processing speech command 310 may involve processes 290p of UI view 290, processes 262p of recognizer 262, processes 263p of speech synthesizer 263, processes 261p of web speech API 261 (e.g., Google speech API service), processes 264p of language translator 264, processes 251p of getControlIdAndAction 251 (in NLP 250), processes 270p of command executor 270, processes 282p of navigator 282, and or processes 281p of helper methods 281.

When speech command 310 is received (e.g., by Voice Recognizer UI Control 262) processes 290p of UI View 290 may deliver voice input via interaction 30 to processes 262p of recognizer 262. Processes 262p of recognizer 262 and processes 260p of web speech API 261 may interact (e.g. interaction 31) to initialize recognizer 262 to recognize the speech and extract a user query string (e.g., native query text). Processes 262p of recognizer 262 and processes 264p of language translator may interact (e.g. interaction 32) to translate the native query text to English query text (if the native query text is not in English). Further, processes 262p of recognizer 262 may extract Control Array and Action Array information from the user query string and deliver the information (e.g., in conjunction with to processes 264p of language translator) to processes 251p of getControlIdAndAction 251 via interaction 33. Using the Control Array and Action Array information from the user query string, UI Control Dictionary 283 and Action Array 274 as input (e.g., input 254), processes 251p of getControlIdAndAction 251 may output control ID and Action information (e.g., output 255) via interaction 34 to processes 270p of command executor 270. Processes 270p of command executor 270 and processes 282p of navigator 282 may interact (e.g., interaction 35) to identify the proper target UI control element for speech command 310. Further, processes 282p of navigator 282 and processes 281p of helper methods 281 may interact (e.g., interaction 36) to properly map the valid action (e.g., a voice output) to the target UI control element in UI5 View 290. Processes 282p of navigator 282 (e.g., in conjunction with processes 263p of speech synthesizer 263) may to execute the action (e.g., a voice output) on the target UI control element, for example, via interactions 37 and 38.

Figure 4:
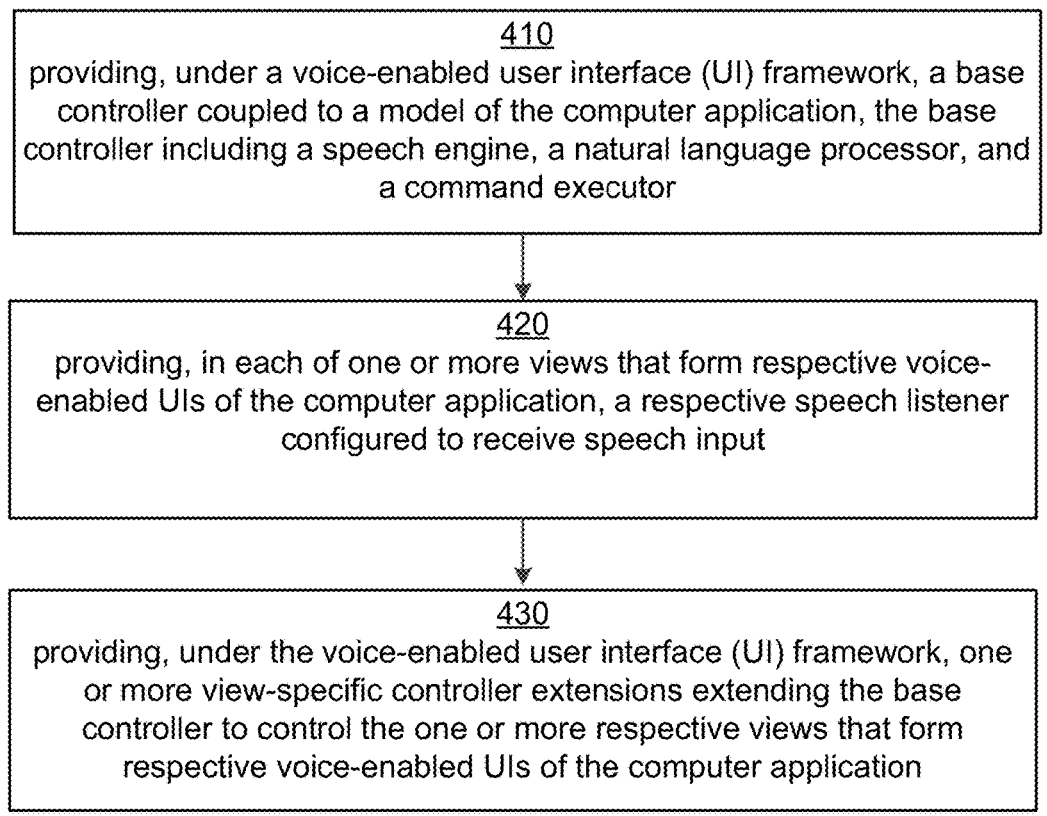
FIG. 4 is an illustration of an example method for adding speech based navigation features for a computer application, in accordance with the principles of the present disclosure.

FIG. 4 shows an example method 400 for adding speech-based navigation features to a computer application, in accordance with the principles of the present disclosure. The computer application may, for example, be a web application (e.g. an enterprise application) that has MVC architecture and conforms to HTML5 standards.

Method 400 includes providing, under a voice-enabled user interface (UI) framework, a base controller coupled to a model of the computer application (410). The base controller may include a speech engine, a natural language processor, and a command executor.

Method 400 further includes providing, in each of one or more views that form respective voice-enabled UIs of the computer application, a respective speech listener configured to receive speech input (420), and providing, under the voice-enabled user interface (UI) framework, one or more view-specific controller extensions extending the base controller to control the one or more respective views that form respective voice-enabled UIs of the computer application (430). Different views present in the voice-enabled UI framework may have different respective view-specific controller extensions. Each view-specific controller extension includes a navigator module customized with logic for executing actions on UI control elements of the respective view.

Method 400 further includes providing an action array listing UI control element events and actions that are supported by the framework, and providing an UI control dictionary that identifies UI control elements that are present in the respective views. The UI control dictionary may be a 2-dimensional array data structure including, for each UI control element, a unique identifying key of the UI control element, a description of the UI control element, a listing of actions that the UI control element supports, and a probability that the UI control element is a target UI control element of a user's query.

For each UI control element, the UI control dictionary may contain a 1-dimensional "control array" containing the foregoing information. For example, for a login button in form, the control array may be ["a#login-btn", "Link, Anchor, Login, Button", "click", "1"], where "a#login-btn" is the unique identifying key of the UI control element, "Link, Anchor, Login, Button" is the description of the UI control element, "click" is a listing of actions that the UI control element supports, and "1" is the probability that the UI control element is a target UI control element of a user's query.

Method 400 further includes configuring the speech engine to process the speech input received by the respective speech listener in the respective view into a text query, and configuring the natural language processor to identify a user command and to extract a target UI control element ID and action of the user command for the respective view from the text query.

Method 400 further includes configuring the command executor to call the view-specific controller extension for the respective view to execute the user command, and configuring the view-specific controller extension to map the user command to the target UI control element and execute the action on the target UI control element in the respective view.

In an example implementation, method 400 may include providing the voice-enabled UI framework as a web page plugin for the computer application.

The various systems and techniques described herein may be implemented in digital electronic circuitry, or in computer hardware, firmware, or in combinations of thereof. The various techniques may implemented as a computer program product, i.e., a computer program tangibly embodied in a non-transitory machine readable storage device, for execution by, or to control the operation of, data processing apparatus, e.g., a programmable processor, a computer, or multiple computers.

Method steps may be performed by one or more programmable processors executing a computer program. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Components of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including a memory and a semiconductor-based processor forming one or more logic circuits generating a voice-enabled user interface (UI) framework for a computer application, the voice-enabled UI framework comprising:
   a base controller coupled to a model of the computer application, the base controller including a speech engine, a natural language processor, and a command executor;
   one or more views that form respective voice-enabled UIs of the computer application, each respective view including a respective speech listener configured to receive speech input; and
   one or more view-specific controller extensions extending the base controller to control the one or more respective views that form respective voice-enabled UIs of the computer application;
   wherein the speech engine is configured to process the speech input received by the respective speech listener in the respective view into a text query that is processed by the natural language processor,
   wherein the natural language processor takes as input the text query, a UI control dictionary, and an action array, and wherein the natural language processor processes the text query to identify a user command in the speech input, wherein the natural language processor extracts a target UI control element and an action of the user command to be performed on the target UI control element from the UI control dictionary, wherein the natural language processor determines a probability value for the identified target UI control element to be a proper target UI control element for the speech input, and wherein the natural language processor stores an updated probability value in the UI control dictionary in relation to the target UI control element, wherein the updated probability value corresponds to the determined probability value, and
   wherein the command executor is configured to call a view-specific controller extension for the respective view to execute the identified user command, and wherein the view-specific controller extension is configured to map the user command to the target UI control element and execute the action on the target UI control element in the respective view.

2. The system of claim 1, wherein different views present in the voice-enabled UI framework have different respective view-specific controller extensions.

3. The system of claim 1 further comprising:
   the action array listing UI control element events and actions that are supported by the voice-enabled UI framework.

4. The system of claim 1, wherein each view-specific controller extension includes a navigator module customized with logic for executing actions on UI control elements of the respective view.

5. The system of claim 1 further comprising:
   the UI control dictionary that identifies UI control elements that are present in the respective views.

6. The system of claim 5, the UI control dictionary is a 2-dimensional array data structure including, for each UI control element, a unique identifying key of the UI control element, description of the UI control element, a listing of actions that the UI control element supports, and a probability that the UI control element is a target UI control element of a user's query defined with the speech input.

7. The system of claim 1, wherein the voice-enabled UI framework includes a synchronous activity execution framework in which the one or more view-specific controller extensions are configured to execute multiple commands in a user's query on the UI and to support continuous interaction between the user and UI control elements using voice commands.

8. The system of claim 1, wherein the voice-enabled UI framework is a web page plugin for the computer application.

9. A method for adding speech based navigation features for a computer application, the method comprising:
   providing, under a voice-enabled user interface (UI) framework, a base controller coupled to a model of the computer application, the base controller including a speech engine, a natural language processor, and a command executor;
   providing, in each of one or more views that form respective voice-enabled UIs of the computer application, a respective speech listener configured to receive speech input;
   providing, under the voice-enabled user interface (UI) framework, one or more view-specific controller extensions extending the base controller to control the one or more respective views that form respective voice-enabled UIs of the computer application;
   configuring the speech engine is configured to process the speech input received by the respective speech listener in the respective view into a text query that is processed by the natural language processor;
   configuring the natural language processor to:
      receive and process the text query, a UI control dictionary, and an action array,
      identify a user command in the speech input,
      extract a target UI control element and an action of the user command to be performed on the target UI control element from the UI control dictionary,
      determine a probability value for the identified target UI control element to be a proper target UI control element for the speech input, and
      stores an updated probability value in the UI control dictionary in relation to the target UI control element, wherein the updated probability value corresponds to the determined probability value; and
   configuring the command executor to call a view-specific controller extension for the respective view to execute the identified user command, and wherein the view-specific controller extension is configured to map the user command to the target UI control element and execute the action on the target UI control element in the respective view.

10. The method of claim 9, wherein different views present in the voice-enabled UI framework have different respective view-specific controller extensions.

11. The method of claim 9 further comprising:
   providing the action array listing UI control element events and actions that are supported by the framework.

12. The method of claim 9 further comprising:
   providing, in each view-specific controller extension, a navigator module customized with logic for executing actions on UI control elements of the respective view.

13. The method of claim 9 further comprising:
   providing the UI control dictionary that identifies UI control elements that are present in the respective views.

14. The method of claim 13, wherein the UI control dictionary is a 2-dimensional array data structure including, for each UI control element, a unique identifying key of the UI control element, description of the UI control element, a listing of actions that the UI control element supports, and a probability that the UI control element is a target UI control element of a user's query defined with the speech input.

15. The method of claim 9 further comprising:
configuring the voice-enabled UI framework to include a synchronous activity execution framework in which the one or more view-specific controller extensions execute multiple commands in a user's query on the UI and support continuous interaction between the user and UI control elements using voice commands.

16. The method of claim 9 further comprising:
providing voice-enabled UI framework as a web page plugin for the computer application.

\* \* \* \* \*